United States Patent
Ogawa (10) Patent No.: US 9,694,698 B2
(45) Date of Patent: Jul. 4, 2017

(54) POWER STORAGE SYSTEM AND CONTROL DEVICE OF POWER STORAGE DEVICE

(71) Applicant: Yohei Ogawa, Toyota (JP)

(72) Inventor: Yohei Ogawa, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 246 days.

(21) Appl. No.: 14/409,248

(22) PCT Filed: Aug. 27, 2013

(86) PCT No.: PCT/IB2013/001851
§ 371 (c)(1),
(2) Date: Dec. 18, 2014

(87) PCT Pub. No.: WO2014/033527
PCT Pub. Date: Mar. 6, 2014

(65) Prior Publication Data
US 2015/0175018 A1     Jun. 25, 2015

(30) Foreign Application Priority Data
Aug. 30, 2012 (JP) .................. 2012-189975

(51) Int. Cl.
*B60L 11/18* (2006.01)
*B60L 3/00* (2006.01)
*B60L 3/04* (2006.01)

(52) U.S. Cl.
CPC ......... *B60L 11/1809* (2013.01); *B60L 3/0084* (2013.01); *B60L 3/0092* (2013.01);
(Continued)

(58) Field of Classification Search
CPC .................................................. B60L 11/1864
(Continued)

(56) References Cited

U.S. PATENT DOCUMENTS 9,461,496 B1 * 10/2016 Zhang ..................... H02J 7/007
2003/0066695 A1 * 4/2003 Beckerman ............... B60T 1/10
180/65.29
(Continued)

FOREIGN PATENT DOCUMENTS

JP     2005-238969 A    9/2005
JP     2012-085470 A    4/2012

*Primary Examiner* — Thuan Do
(74) *Attorney, Agent, or Firm* — Sughrue Mion, PLLC (57) ABSTRACT

A power storage system mounted on a vehicle including: a power storage device (10) that performs charging and discharging; a voltage monitoring unit (20) that detects a voltage of the power storage device (10); and a controller (50) that controls charging and discharging of the power storage device (10), wherein the controller (50) performs consistency determination processing, which determines whether the controller (50) and the voltage monitoring unit (20) are consistent, based on control information that is predefined for the power storage device (10) for which the controller (50) controls charging and discharging and, if it is determined in the consistency determination processing that the controller (50) and the voltage monitoring unit (20) are not consistent, performs control so that the power storage device (10) does not perform charging and discharging.

10 Claims, 5 Drawing Sheets

(52) U.S. Cl.
CPC ............. *B60L 3/04* (2013.01); *B60L 11/1851* (2013.01); *B60L 11/1864* (2013.01); *B60L 2240/547* (2013.01); *B60L 2240/549* (2013.01); *B60L 2260/44* (2013.01); *Y02T 10/7005* (2013.01); *Y02T 10/7061* (2013.01)

(58) Field of Classification Search
USPC ........................................................ 320/109
See application file for complete search history.

(56) References Cited

U.S. PATENT DOCUMENTS

2006/0028178 A1   2/2006  Hobbs
2010/0138087 A1   6/2010  Takaoka

* cited by examiner

POWER STORAGE SYSTEM AND CONTROL DEVICE OF POWER STORAGE DEVICE

BACKGROUND OF THE INVENTION

1. Field of the Invention

The present invention relates to a power storage system mounted on a vehicle and a control device of a power storage device.

2. Description of Related Art

Various sensors such as a voltage sensor, a current sensor, and a temperature sensor are connected to a battery mounted on a vehicle. The charging and discharging of the battery is controlled while getting information about the state of the battery based on the detection result of the sensors.

Like the case in which a battery is replaced due to a deterioration or a failure (Japanese Patent Application Publication No. 2005-238969 (JP-2005-238969 A)), a voltage sensor connected to a battery also needs to be replaced in some cases due to a failure. In this case, however, when an incorrect voltage sensor that is not normally connected to the battery is connected to the battery, there is a possibility that the information about the battery state (voltage) cannot be correctly obtained.

That is, as described in Japanese Patent Application Publication No. 2012-085470 (JP-2012-085470 A), even when a non-regular battery is mounted on a vehicle, the information about the battery state can be obtained based on the detection value of the voltage sensor for use in controlling the charging and discharging of the battery. However, when the voltage sensor is not consistent with the battery, in other words, when the control device for controlling the charging and discharging of the battery is not consistent with the voltage sensor, the information about the battery state cannot be obtained correctly in some cases.

SUMMARY OF THE INVENTION

The present invention provides a power storage system and a control device of a power storage device for preventing a vehicle from traveling when the voltage monitoring unit does not correctly acquire information about the state of the power storage device.

A first aspect of the present invention relates to a power storage system mounted on a vehicle. The power storage system includes: a power storage device that performs charging and discharging; a voltage monitoring unit that detects a voltage of the power storage device; and a controller that controls charging and discharging of the power storage device, wherein the controller performs consistency determination processing, that determines whether the controller and the voltage monitoring unit are consistent, based on control information that is predefined for the power storage device for which the controller controls charging and discharging and, if it is determined in the consistency determination processing that the controller and the voltage monitoring unit are not consistent, performs control so that the power storage device does not perform charging and discharging.

According to the configuration in the first aspect of the present invention, it is determined whether the controller and the voltage monitoring unit are consistent based on the control information predefined for the power storage device for which the controller controls charging and discharging. This configuration prevents charging and discharging, which is based on a voltage detection value received from a voltage monitoring unit not consistent with the controller, from being performed, thus preventing a vehicle from traveling when the information about the state of the power storage device is not acquired correctly.

The power storage system may further include: a memory unit that stores in advance a correspondence between the control information and identification information, the identification information assigned in advance to the voltage monitoring unit. In this case, the controller may perform the consistency determination processing based on the identification information output from the voltage monitoring unit, and the controller may compare the identification information, output from the voltage monitoring unit, and the identification information, stored in the memory unit, to perform the consistency determination processing.

When the controller controls the charging and discharging of the power storage device after first consistency determination processing, the controller may perform second consistency determination processing if it is determined in the first consistency determination processing that the controller and the voltage monitoring unit are consistent, and may permit charging and discharging of the power storage device if it is determined in the second consistency determination processing that the controller and the voltage monitoring unit are not consistent. The above configuration allows a vehicle to travel by the charging and discharging of the power storage device even after it is once determined that the controller and the voltage monitoring unit are consistent (even after an incorrect determination is detected), thus preventing a situation in which the vehicle cannot travel.

The power storage system may further include: a motor generator that receives power from the power storage device to generate kinetic energy used for travel of the vehicle; an inverter that converts a direct current power of the power storage device to an alternating current power and outputs the converted alternating current power; and a voltage sensor that detects a voltage of the inverter. In this case, when the controller permit charging and discharging of the power storage device after it is determined in the second consistency determination processing that the controller and the voltage monitoring unit are not consistent, the controller may use a voltage of the inverter, detected by the voltage sensor, to controls charging and discharging of the power storage device. The above configuration allows charging and discharging to be controlled while acquiring information about the state of the power storage device during the travel of a vehicle in which the charging and discharging of the power storage device is permitted after consistency is once detected (after incorrect consistency is detected).

The vehicle may be a hybrid vehicle including an engine and a motor generator that receives power from the power storage device to generate kinetic energy used for a travel of the vehicle. In this case, when the controller may control charging and discharging of the power storage device after first consistency determination processing, the controller may perform second consistency determination processing if it is determined in the first consistency determination processing that the controller and the voltage monitoring unit are consistent, and may perform control so that travel of the vehicle with the engine is permitted while performing control so that charging and discharging of the power storage device is not performed if it is determined in the second consistency determination processing that the controller and the voltage monitoring unit are not consistent. Therefore, this configuration allows a vehicle to travel even after it is once determined that the controller and the voltage monitoring unit are consistent (even after an incorrect determination is detected), thus preventing a situation in which the vehicle cannot travel.

The controller may perform the consistency determination processing when the voltage monitoring unit is replaced.

If it is determined in the second consistency determination processing that the controller and voltage monitoring unit are consistent, the controller may not perform consistency determination processing when the controller controls charging and discharging of the power storage device after the second consistency determination processing. The above configuration prevents the consistency determination processing from being performed more times than necessary.

A second aspect of the present invention relates to a control device of a power storage device mounted on a vehicle. The control device includes the controller that controls charging and discharging of the power storage device, wherein the controller performs consistency determination processing, that determines whether the controller and the voltage monitoring unit, which detects a voltage of the power storage device, are consistent, based on control information that is predefined for the power storage device for which the controller controls charging and discharging and, if it is determined in the consistency determination processing that the controller and the voltage monitoring unit are not consistent, performs control so that the power storage device does not perform charging and discharging. According to the configuration in the second aspect of the present invention, the control device prevents a vehicle from traveling when the information about the state of the power storage device is not acquired correctly as in the first aspect.

A third aspect of the present invention relates to a power storage system mounted on a vehicle. The power storage system includes: a power storage device that performs charging and discharging; a voltage monitoring unit that detects a voltage of the power storage device; a motor generator that receives power from the power storage device to generate kinetic energy used for a travel of the vehicle; an inverter that converts a direct current power of the power storage device to an alternating current power and outputs the converted alternating current power; a voltage sensor that detects a voltage of the inverter; and a controller that controls charging and discharging of the power storage device, wherein: when a user runs the vehicle after the voltage monitoring unit is replaced, the controller performs consistency determination processing, which determines whether the controller and the voltage monitoring unit are consistent, based on control information that is predefined for the power storage device for which the controller 50 controls charging and discharging; and if it is determined in the consistency determination processing that the controller and the voltage monitoring unit are not consistent, the controller uses a voltage of the inverter, detected by the voltage sensor, to permit charging and discharging of the power storage device. According to the configuration in the third aspect of the present invention, the power storage system allows a vehicle to travel by permitting the charging and discharging of the power storage device while acquiring information about the state of the power storage device when a user runs the vehicle after the voltage monitoring unit is replaced or the voltage monitoring unit as well as the power storage device is replaced.

A fourth aspect of the present invention relates to a power storage system mounted on a vehicle. The power storage system includes: a power storage device that performs charging and discharging; a voltage monitoring unit that detects a voltage of the power storage device; and a controller that controls charging and discharging control of the power storage device, wherein: the vehicle is a hybrid vehicle including an engine and a motor generator that receives power from the power storage device to generate kinetic energy used for travel of the vehicle; when a user runs the vehicle after the voltage monitoring unit is replaced, the controller performs consistency determination processing, which determines whether the controller and the voltage monitoring unit are consistent, based on control information that is predefined for the power storage device for which the controller controls charging and discharging; and, if it is determined in the consistency determination processing that the controller and the voltage monitoring unit are not consistent, the controller performs control so that travel of the vehicle with the engine is permitted while performing control so that charging and discharging of the power storage device is not performed.

A fifth aspect of the present invention relates to a control method for a power storage device mounted on a vehicle. The control method includes: receiving identification information, assigned in advance to a voltage monitoring unit that detects a voltage of the power storage device, from the power storage device; performing consistency determination processing, which determines whether control information, predefined for the power storage device for which charging and discharging is controlled, and the received identification information are consistent, based on the received identification information; and, if it is determined in the consistency determination processing that the control information and the received identification information are not consistent, performing control so that the power storage device does not perform charging and discharging. According to the fifth aspect of the present invention, the control method prevents a vehicle from traveling when the information about the state of the power storage device is not acquired correctly as in the first aspect of the present invention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An exemplary embodiment of the present invention is described below.

Figure 1:
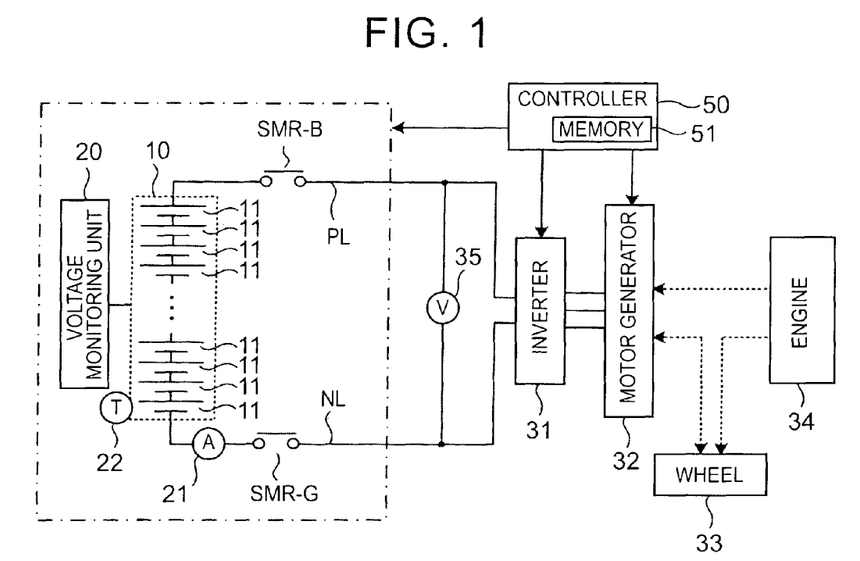
FIG. 1 is a diagram showing the configuration of a battery system mounted on a vehicle in an exemplary embodiment.

A battery system in this exemplary embodiment is described with reference to FIG. 1. FIG. 1 is a general diagram showing the configuration of the battery system. The battery system in this exemplary embodiment is mounted on a vehicle. The vehicle is a hybrid vehicle or an electric vehicle. Although a hybrid vehicle is described as an example in this exemplary embodiment, the vehicle may be an electric vehicle that has only a battery system (assembled battery) as the source of power for running the vehicle.

The battery system has an assembled battery 10. The positive electrode terminal of the assembled battery 10 and an inverter 31 are connected via a positive electrode line (cable) PL, and the negative electrode terminal of the assembled battery 10 and the inverter 31 are connected via a negative electrode line (cable) NL. The positive electrode line PL has a system main relay SMR-B, and the negative electrode line NL has a system main relay SMR-G.

The inverter 31 converts a direct current power, supplied from the assembled battery 10, to an alternating current power. Between the positive electrode line PL and the negative electrode line NL, both of which are connected to the inverter 31, is connected a voltage sensor 35 that detects an inverter voltage VL. The voltage sensor 35 outputs the detection result to a controller 50.

A motor generator 32 (AC motor) is connected to the inverter 31. The motor generator 32 receives an alternating current power supplied from the inverter 31 to generate kinetic energy for running the vehicle. The motor generator 32 is connected to wheels 33. An engine 34 is connected to the wheels 33, and the kinetic energy generated by the engine 34 is transmitted to the wheels 33. This configuration allows the vehicle to travel using the output of the assembled battery 10 or the engine 34.

When the vehicle is decelerated or stopped, the motor generator 32 converts the kinetic energy, generated when the vehicle is braked, to electric energy (alternating current power). The inverter 31 converts the alternating current power, generated by the motor generator 32, to a direct current power, and supplies the converted direct current power to the assembled battery 10. This allows the assembled battery 10 to store the regenerative power. In the case of a hybrid vehicle, not only the regenerative power but also electric energy, generated by driving the motor generator 32 by means of the engine 34, is stored in the assembled battery 10.

The controller 50 outputs the control signal to each of the inverter 31 and the motor generator 32 to control the driving of the inverter 31 and the motor generator 32. The controller 50 includes a memory 51 in which various types of information are stored. The memory 51 may be an internal device or an external device of the controller 50. A controller that controls the inverter 31 or a controller that controls the motor generator 32 may be provided separately. In addition, a controller that controls the consistency determination processing, which is described later, may also be provided separately.

The controller 50 outputs the control signal also to the system main relays SMR-B and SMR-G to switch the system main relays SMR-B and SMR-G between on and off. The system main relays SMR-B and SMR-G, when turned on, connect the assembled battery 10 and the inverter 31 to start the battery system.

Although the assembled battery 10 in this exemplary embodiment is connected directly to the inverter 31, the present invention is not limited to this configuration. More specifically, a booster circuit may be added to the current path between the assembled battery 10 and the inverter 31. This added booster circuit can increase the output voltage of the assembled battery 10 and supply the increased power to the inverter 31. The booster circuit can also decrease the output voltage of the inverter 31 and supply the decreased power to the assembled battery 10. The booster circuit, when provided in this manner, allows the voltage sensor 35 to detect the voltage, input from the booster circuit to the inverter 31, or the voltage, output from the inverter 31 to the booster circuit, as an inverter voltage.

The vehicle in this exemplary embodiment includes not only the assembled battery 10 but also the engine 34, which is an internal combustion engine, as the source of power for running the vehicle. The engine 34 uses gasoline, diesel fuel, or biofuel.

The vehicle in this exemplary embodiment can travel using only the output of the assembled battery 10 (Electric Vehicle (EV) travel mode) or using both the assembled battery 10 and the engine 34 (Hybrid Vehicle (HV) travel mode). The vehicle in this exemplary embodiment can also travel using only the engine 34.

The assembled battery 10 can also be charged using an external power supply. The external power supply refers to a power supply provided outside of, and separately from, the vehicle. The external power supply is, for example, commercial power supply. When commercial power supply is used, a battery charger, not shown, for converting alternating current power to direct current power is required. The battery charger may be provided outside of, and separately from, the vehicle or may be added to the battery system shown in FIG. 1.

The assembled battery 10 (which functions as a power storage device) includes a plurality of unit cells 11 (each of which functions as a power storage element) electrically connected in series. The number of unit cells 11 of the assembled battery 10 may be determined appropriately based on the required output of the assembled battery 10. The assembled battery 10 may include a plurality of unit cells 11 electrically connected in parallel.

As the unit cell 11, a secondary battery such as a nickel metal-hydride battery or a lithium ion battery may be used. Instead of a secondary battery, an electric double layer capacitor (condenser) may be used.

The unit cell 11 has a battery case in which a power generating element that performs charging and discharging is stored. The power generating element includes a positive electrode element, a negative electrode element, and a separator arranged between the positive electrode element and the negative electrode element. The positive electrode element includes a current collector and a positive electrode active material layer formed on the surface of the current collector. The negative electrode element includes a current collector and a negative electrode active material layer formed on the surface of the current collector. The separator, the positive electrode active material layer, and the negative electrode active material layer include electrolytic solution. Instead of electrolytic solution, solid electrolyte may be used.

A voltage monitoring unit 20 detects the voltage of the assembled battery 10 and outputs the detection result to the controller 50. In this exemplary embodiment, the voltage monitoring unit 20 individually detects the voltage of each of the plurality of unit cells 11 of the assembled battery 10. In addition, the voltage monitoring unit 20 can detect the voltage across the terminals of the assembled battery 10, and can detect the voltage of each of a plurality of blocks created by dividing the plurality of unit cells 11 of the power storage device 10 into a plurality of blocks. The voltage monitoring unit 20 detects the voltage of the assembled battery 10 and/or each unit cell 11 at a predetermined interval or at a predetermined time and outputs the detected value to the controller 50.

The voltage monitoring unit 20 in this exemplary embodiment can be replaceable with respect to the assembled battery 10. For example, the voltage monitoring unit 20 can be detachable with respect to the circuit board of the power storage device 10. The detection lines, connected to the positive/negative electrodes of the unit cells 11 of the assembled battery 10, are collected on the circuit board. When the voltage monitoring unit 20, mounted on the circuit board, is connected to the controller 50, the voltage detection value of each unit cell 11 is output to the controller 50.

A current sensor 21 is provided on the current path of the assembled battery 10. The current sensor 21 detects the charging-discharging current flowing through the assembled battery 10 and outputs the detection result to the controller 50.

A temperature sensor 22 detects the temperature of the assembled battery 10 and outputs the detection result to the controller 50. The number of temperature sensors 22 may be determined appropriately. When a plurality of the temperature sensors 22 is used, the average value of the temperatures detected by the plurality of temperature sensors 22 may be used as the temperature of the assembled battery 10, or the temperature detected by a particular temperature sensor 22 may be used as the temperature of the assembled battery 10.

In the example shown in FIG. 1, the area including the assembled battery 10 and surrounded by the dashed line indicates a battery pack. The battery pack includes the assembled battery 10, the voltage monitoring unit 20 connected to the assembled battery 10, the sensor apparatuses such as the current sensor 21 and the temperature sensor 22, the positive electrode line PL, the negative electrode line NL, the system main relays SMR-B and SMR-G, and conducting apparatuses such as a service plug or fuses not shown. The battery pack is mounted on a vehicle wherein the battery pack is connected to the positive electrode line PL and the negative electrode line NL, both of which are extended from the inverter 31, via connectors and wherein the assembled battery 10 is connected to the inverter 31 via the system main relays SMR-B and SMR-G.

As described above, the vehicle-mounted battery system in this exemplary embodiment is configured so that the battery pack itself can be replaced and, at the same time, a component included in the battery pack, such as the voltage monitoring unit 20, can be replaced separately without having to replace the battery pack itself.

Next, the following describes the consistency determination processing in this exemplary embodiment for determining the consistency between the controller 50 and the voltage monitoring unit 20. The consistency determination processing is executed when the voltage monitoring unit 20 is replaced. Here, when the battery pack is replaced, the voltage monitoring unit 20 included in the battery pack is also replaced. Based on the control information stored in the controller 50 and predefined for the assembled battery 10 for which the controller 50 is to perform charging-discharging control (i.e., control charging and discharging), the consistency determination processing determines whether the controller 50 and the voltage monitoring unit 20 are consistent.

Figure 2A:
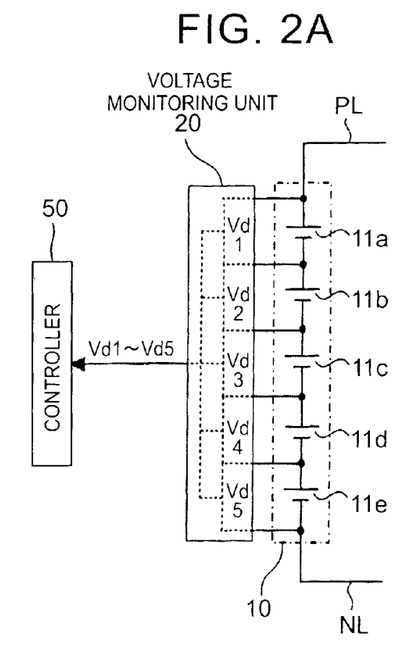
FIGS. 2A and 2B are diagrams showing the correspondence among an assembled battery, a voltage monitoring unit, and a controller in the exemplary embodiment.
Figure 2B:
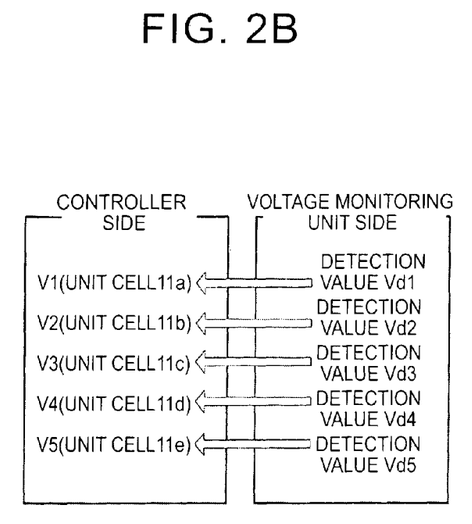

First, the consistency between the controller 50 and the voltage monitoring unit 20 is described with reference to FIGS. 2A and 2B. As shown in FIG. 2A, the voltage monitoring unit 20 outputs the voltage detection values Vd1-Vd5 of five unit cells 11a, 11b, 11c, 11d, and 11e of the assembled battery 10 to the controller 50. The controller 50 recognizes the detection values Vd1-Vd5, output from the voltage monitoring unit 20, as voltage values V1-V5 corresponding, respectively, to the unit cells 11a, 11b, 11c, 11d, and 11e.

The control information predefined for the assembled battery 10, for which charging-discharging control is performed by the controller 50, is stored in the memory 51. For example, as shown in FIG. 2B, the control information defines that the voltage values of the unit cells 11a, 11b, 11c, 11d, and 11e of the assembled battery 10 are V1-V5 respectively.

The voltage monitoring unit 20 detects the voltages of the unit cells 11a-11e in the order of unit cells 11a, 11b, 11c, 11d, and 11e, and outputs the detection values Vd1-Vd5 to the controller 50 in the order in which the detection values Vd1-Vd5 are detected. The controller 50 recognizes the voltage values in the order, in which the detection values Vd1-Vd5 are output from the voltage monitoring unit 20, as follows. That is, the controller 50 recognizes the detection value Vd1, which is the first output value, as the voltage value V1 of the unit cell 11a, the detection value Vd2, which is the second output value, as the voltage value V2 of the unit cell 11b, the detection value Vd3, which is third output value, as the voltage value V3 of the unit cell 11c, the detection value Vd4, which is the fourth output value, as the voltage value V4 of the unit cell 11d, and the detection value Vd5, which is the fifth output value, as the voltage value V5 of the unit cell 11e.

That is, the controller 50 and the voltage monitoring unit 20 are configured on the premise that the number of unit cells 11 of the assembled battery 10, which is predefined for the assembled battery 10 for which charging-discharging control is performed by the controller 50, is equal to the number of values detected by the voltage monitoring unit 20. The voltage monitoring unit 20 outputs the detection values, corresponding one-to-one to the unit cells 11 of the assembled battery 10 for which charging-discharging control is performed by the controller 50, to the controller 50 in the order in which the detection values are detected. The controller 50 recognizes the received detection values as the voltage values V1-V5 of the unit cells 11a, 11b, 11c, 11d, and 11e in the order in which the detection values are received, and performs charging-discharging control for the assembled battery 10.

As described above, based on the control information predefined according to the specification (for example, number of unit cells 11) of the assembled battery 10, the voltage monitoring unit 20, which is predetermined according to the relation with the controller 50 that will perform charging-discharging control for the assembled battery 10, needs to be connected to the assembled battery 10. However, when the voltage monitoring unit 20 is replaced for reasons such as a failure, an incorrect voltage monitoring unit, which is not normally connected, is connected in some cases.

Figure 3A:
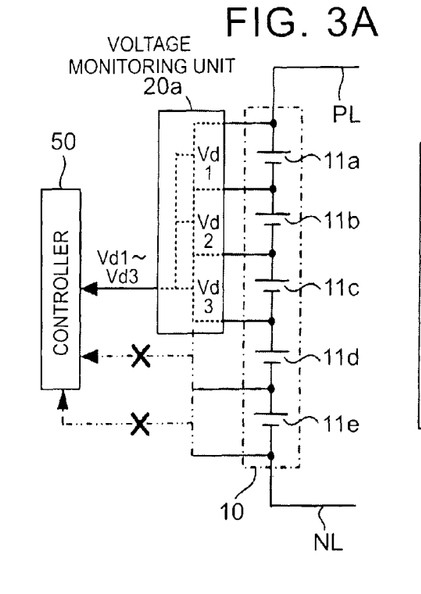
FIGS. 3A and 3B are diagrams showing a first example of inconsistency between the controller and the voltage monitoring unit in the exemplary embodiment.
Figure 3B:
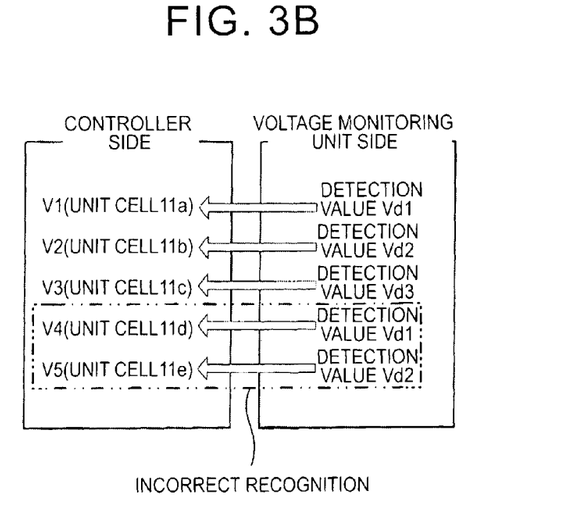

FIGS. 3A and 3B are diagrams showing an example in which a voltage monitoring unit 20a, which is inconsistent with the controller 50, is connected. Unlike the voltage monitoring unit 20 shown in FIG. 2A, the voltage monitoring unit 20a can detect the voltages of only three unit cells 11a, 11b, and 11c.

The controller 50 performs charging-discharging control assuming that the detection values, corresponding to the voltage values V1-V5, will be received, based on the control information predefined according to the number of unit cells 11 of the assembled battery 10. Therefore, when the voltage monitoring unit 20a can detect the voltages of only three unit cells, 11a, 11b, and 11c of the five unit cells 11a, 11b, 11c, 11d, and 11e as shown in the example in FIGS. 3A and 3B, the controller 50 can recognize the detection value Vd1, which is the first output value from the voltage monitoring unit 20a, as the voltage value V1 of the unit cell 11a, the detection value Vd2, which is the second output value, as the voltage value V2 of the unit cell 11b, and the detection value Vd3, which is the third output value, as the voltage value V3 of the unit cell 11c. However, the controller 50 incorrectly recognizes the detection value Vd1, which is the fourth output value, as the voltage value V4 of the unit cell 11d, and the detection value Vd2, which is the fifth output value, as the voltage value V5 of the unit cell 11e. That is, the controller 50 incorrectly recognizes the detection value Vd1, which is output next and corresponds to the unit cells 11a, as the voltage value V4 corresponding to the unit cell 11d, and the detection value Vd2, which is output next and corresponds to unit cell 11b, as the voltage value V5 corresponding to the unit cell 11e.

The controller 50, which is not aware that the voltage values of the unit cell 11d and the unit cell 11e are incorrectly recognized, performs charging-discharging control without acquiring correct information about the state of the assembled battery 10. Failure to acquire correct information about the state of the assembled battery 10 may result in not detecting an abnormal condition of the unit cells 11.

Figure 4A:
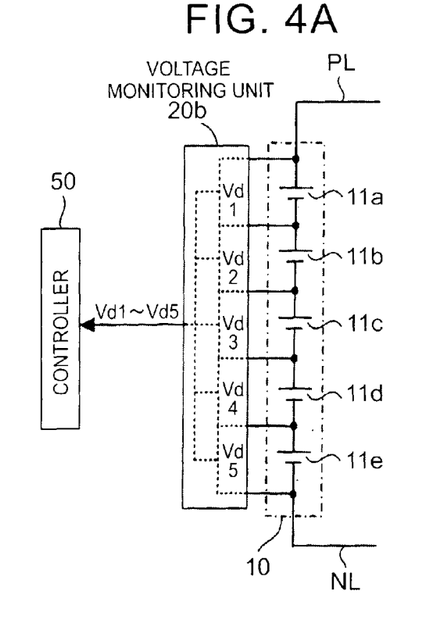
FIGS. 4A and 4B are diagrams showing a second example of inconsistency between the controller and the voltage monitoring unit in the exemplary embodiment.
Figure 4B:
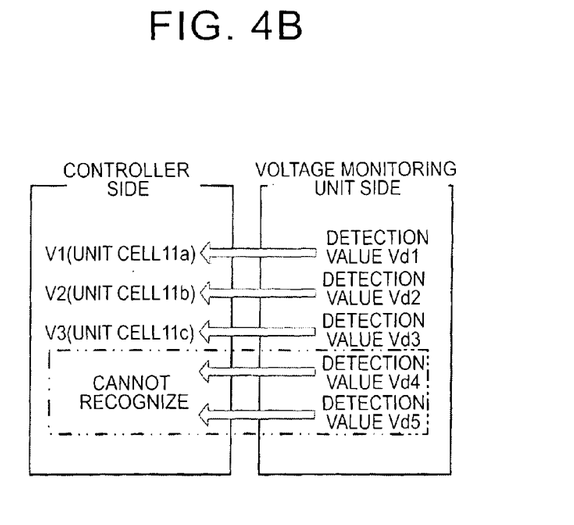

As shown in FIGS. 4A and 4B, the battery pack itself, including the voltage monitoring unit 20, must be replaced due to a deterioration or a failure of the assembled battery 10. In this case, too, an incorrect battery pack, which is not normally mounted, is mounted on the vehicle.

FIGS. 4A and 4B show another example. In this example, based on the control information predefining that the number of unit cells 11 of the assembled battery 10 is three, the controller 50 performs charging-discharging control assuming that the detection values corresponding to voltage values V1-V3 will be received. In addition, a voltage monitoring unit 20b, which detects the voltage values of five unit cells 11a, 11b, 11c, 11d, and 11e, is mounted on a vehicle at battery pack replacement time in this example. In this case, the controller 50 recognizes the voltage values as follows. That is, the controller 50 can recognize the detection value Vd1, which is the first output value from the voltage monitoring unit 20b, as the voltage value V1 of the unit cell 11a, the detection value Vd2, which is the second output value, as the voltage value V2 of the unit cell 11b, and the detection value Vd3, which is the third output value, as the voltage value V3 of the unit cell 11c. However, the controller 50 cannot recognize the detection value Vd4, which is the fourth output value, and the detection value Vd5 which is the fifth output value.

That is, the controller 50 incorrectly recognizes the detection value Vd4, which is the fourth output value, as the voltage value V1 of the unit cell 11a which is detected next, and the detection value Vd5, which is the fifth output value, as the voltage value V2 of the unit cell 11b which is detected next. The controller 50 cannot recognize the voltage values of the unit cells 11d and 11e and, in addition, incorrectly recognizes the voltage values of the unit cells 11a and 11b as in FIGS. 3A and 3B.

To address this problem, when the voltage monitoring unit 20 or the battery pack is replaced, this exemplary embodiment performs the consistency determination processing for the controller 50 and the voltage monitoring unit 20. If the controller 50 and the voltage monitoring unit 20 are not consistent, the exemplary embodiment inhibits the charging-discharging control of the assembled battery 10.

Figure 5:
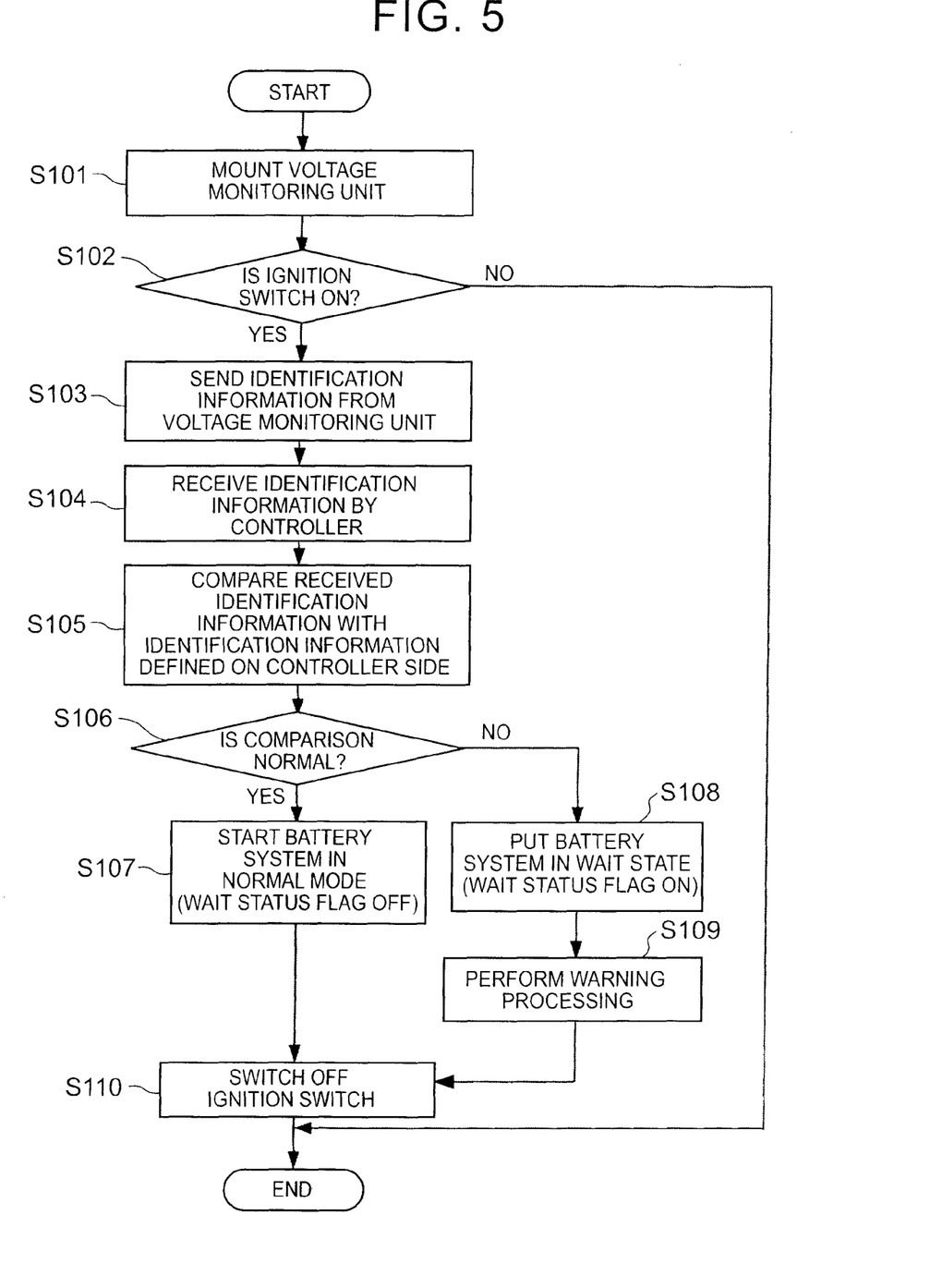
FIG. 5 is a flowchart showing an example of consistency determination processing for the voltage monitoring unit and battery system startup processing according to the consistency determination result performed when the voltage monitoring unit is replaced (mounted) in the exemplary embodiment.

FIG. 5 is a flowchart showing the consistency determination processing in this exemplary embodiment. FIG. 5 shows an example of the consistency determination processing when the voltage monitoring unit 20 or the battery pack is replaced (mounted). The voltage monitoring unit 20 is replaced, for example, by a maintenance engineer in a store or a repair shop.

After the voltage monitoring unit 20 is replaced (S101), the controller 50 determines whether the ignition switch is turned on (S102). If the ignition switch is turned on, the controller 50 starts the consistency determination processing. The controller 50 can also start the consistency determination processing when the ignition switch is turned on at the time the voltage monitoring unit 20 is replaced. For example, if a mechanical or electrical connection between the voltage monitoring unit 20 and the vehicle is once interrupted, the controller 50 can detect that the voltage monitoring unit 20 is replaced and store the replacement history in the memory 51.

The controller 50 sends a control signal to the voltage monitoring unit 20, which has been replaced, to request it to output the identification information. The unique identification information is assigned in advance to the voltage monitoring unit 20. The memory 51 stores in advance the identification information about the voltage monitoring unit 20, and this identification information corresponds to the control information predefined for the assembled battery 10 for which the controller 50 performs charging-discharging control.

In response to the control signal from the controller 50, the voltage monitoring unit 20 outputs the identification information to the controller 50 (S103), and the controller 50 receives the identification information from the voltage monitoring unit 20 (S104). At this time, the voltage monitoring unit 20 can send the identification information to the controller 50, one bit at a time. On the other hand, the controller 50 can receive the data, one bit at a time, and restore the received data to the identification information.

The controller 50 compares the identification information, received from the voltage monitoring unit 20, with the identification information on the voltage monitoring unit stored in advance in the memory 51 (S105).

If it is determined that the mounted voltage monitoring unit 20 is consistent with the controller 50 (normal) as a result of comparison with the identification information received from the voltage monitoring unit 20 (YES in S106), the controller 50 starts the battery system in the normal mode (S107). More specifically, the controller 50 switches the system main relays SMR-B and SMR-G from off to on to connect the assembled battery 10 with the inverter 31.

In step S107, because the result of comparison with the voltage monitoring unit 20 is normal, the controller 50 turns off the wait status flag stored in the memory 51. The wait status flag indicates the result of the consistency determination processing. If the comparison result is not normal, that is, if the voltage monitoring unit 20 is not consistent with the controller 50, the controller 50 turns on the wait status flag. When the wait status flag is ON, the controller 50 restricts the start of the battery system the next time the ignition switch is turned on as will be described later.

On the other hand, if it is determined in step S106 that the comparison result is not normal, the processing proceeds to step S108. In step S108, the controller 50 restricts the start of the battery system and prevents the battery system from being started (does not connect the assembled battery 10 and the inverter 31 with the system main relays SMR-B and SMR-G turned off). At this time, because the result of comparison with the voltage monitoring unit 20 is not normal as described above, the controller 50 turns on the wait status flag stored in the memory 51.

If it is determined that the comparison result is not normal, the controller 50 performs predetermined warning processing (S109). For example, the controller 50 can turn on the warning lamp or output a warning sound or a warning display.

After that, when the ignition switch is switched from on to off, the controller 50 terminates the consistency determination processing and, if the battery system is still placed in the started state, terminates charging-discharging control. That is, the controller 50 switches the system main relays SMR-B and SMR-G from on to off to interrupt the connection between the assembled battery 10 and the inverter 31.

The consistency determination processing is performed as described above when the voltage monitoring unit 20 is replaced by a maintenance engineer. If it is determined, during this consistency determination processing, that an incorrect voltage monitoring unit, which is not normally mounted on the controller 50, is mounted on the controller 50, the controller 50 performs control processing so that the charging and discharging of the assembled battery 10 is not permitted (i.e., the controller 50 does not permit the start of the battery system). Therefore, this control processing prevents charging-discharging control, which is based on a detection value from the voltage monitoring unit 20 not consistent with the controller 50, from being performed, that is, prevents a vehicle from traveling when the information about the assembled battery 10 cannot be obtained correctly.

In the example in FIG. 5, if it is determined, during the consistency determination processing performed by a maintenance specialist in a store or a repair shop at the replacement time of the voltage monitoring unit 20 (hereinafter called first consistency determination processing), that the comparison result is not normal (meaning that voltage monitoring unit 20 is not consistent with the controller 50), the controller 50 performs control processing so that the charging and discharging of the assembled battery 10 is not performed. In this manner, the controller 50 prevents a vehicle from traveling when the information about the assembled battery 10 cannot be obtained correctly. However, during the first consistency determination processing, it is supposed that the controller 50 sometimes cannot detect that an incorrect voltage monitoring unit, which is not normally mounted on the controller 50, is mounted.

In this exemplary embodiment, the controller 50 performs the consistency determination processing again (hereinafter called the second consistency determination processing) when the vehicle is delivered to the user and the user starts the battery system for the first time after the replacement of the voltage monitoring unit 20.

In addition, if it is determined in this exemplary embodiment that the comparison result is not normal as a result of the second consistency determination processing that is performed when the user starts the battery system for the first time, the controller 50 performs charging-discharging control different from that performed when the voltage monitoring unit 20 is replaced by a maintenance specialist. That is, instead of performing charging-discharging control so that the charging and discharging of the assembled battery 10 is not permitted, the controller 50 performs charging-discharging control in the saving travel mode in which the vehicle can travel while permitting the charging and discharging of the assembled battery 10.

Figure 6:
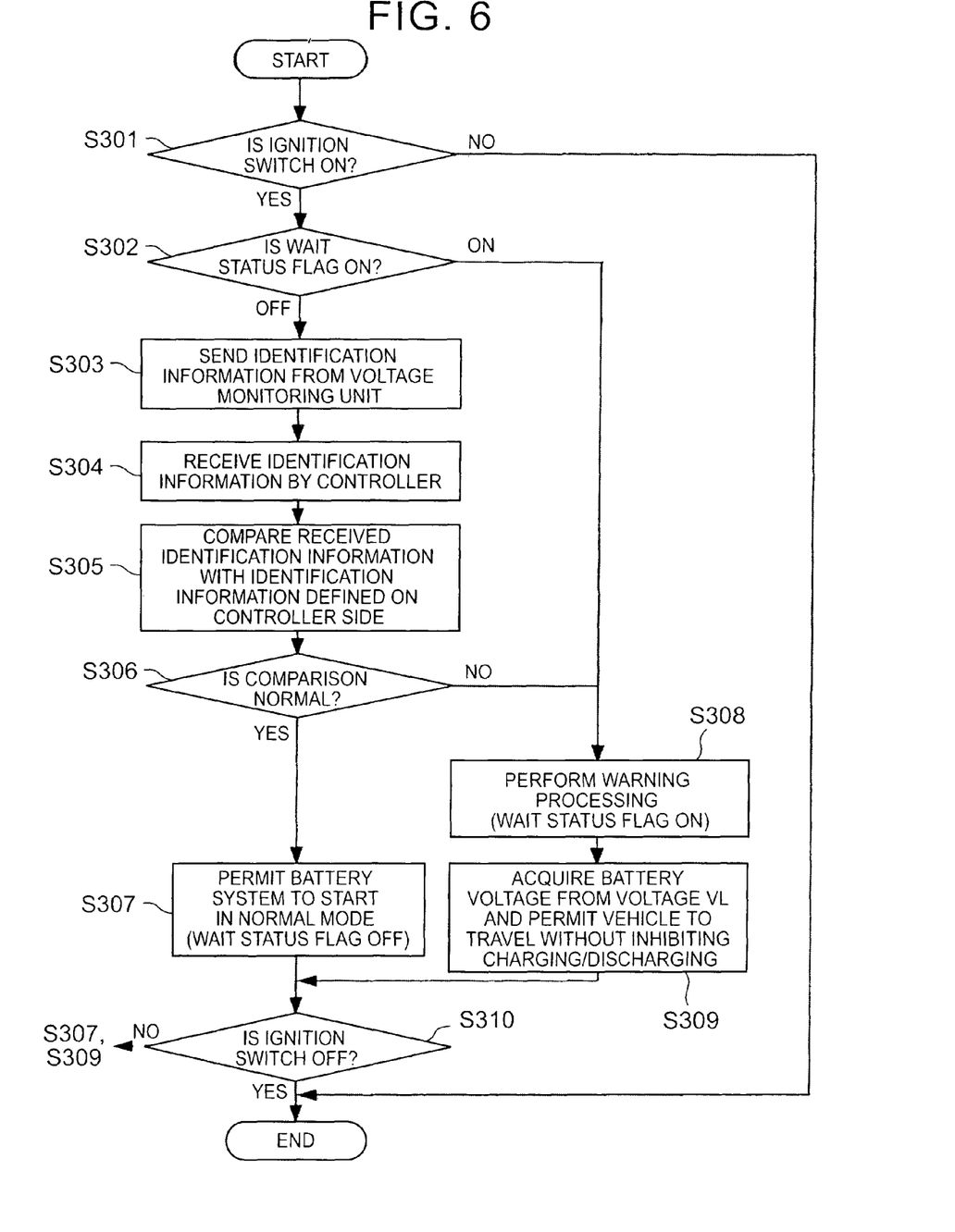
FIG. 6 is a flowchart showing a first example of consistency determination processing for the voltage monitoring unit and vehicle traveling according to the consistency detection result when the user starts running the vehicle after the voltage monitoring unit is replaced (mounted) in the exemplary embodiment.

FIG. 6 is a flowchart showing an example of the second consistency determination processing and the saving travel mode processing that are performed when the user starts the battery system for the first time after the replacement of the voltage monitoring unit 20.

As shown in FIG. 6, when the ignition switch is switched from off to on (S301), the controller 50 references the wait status flag stored in the memory 51 to confirm the determination result of the first consistency determination processing (S302). If the wait status flag is OFF, the controller 50 performs the second consistency determination processing. Steps S303 to S305 correspond to steps S103 to S105 in FIG. 5. The same processing is performed in those steps and, therefore, the description is not repeated.

If the comparison result is normal in step S306, the controller 50 passes control to step S307. In this step, the controller 50 starts the battery system in the normal mode (S307) and leaves the wait status flag in the memory 51 OFF.

On the other hand, if it is determined in step S306 that the comparison result is not normal, the controller 50 passes control to step S308. In this step, the controller 50 performs the warning processing, similar to that in step S109 in FIG. 5, and changes the wait status flag in the memory 51 from OFF to ON. After that, the controller 50 does not inhibit the charging and discharging of the assembled battery 10 but permits the vehicle to travel in the saving travel mode (S309) in which the vehicle is permitted to travel while permitting the charging and discharging of the assembled battery 10.

More specifically, if it is determined in step S306 that the comparison result is not normal, the controller 50 switches the system main relays SMR-B and SMR-G from off to on to connect the assembled battery 10 to the inverter 31 and starts the battery system.

In the saving travel mode, to avoid charging-discharging control of the assembled battery 10 when the controller 50 and voltage monitoring unit 20 are not consistent (i.e., when information about the state of the assembled battery 10 is not acquired), the controller 50 can perform charging-discharging control of the assembled battery 10 based on the inverter voltage VL detected by the voltage sensor 35 shown in FIG. 1.

After that, when the ignition switch is switched from on to off (S310), the controller 50 terminates the consistency determination processing and, at the same time, terminates the charging-discharging control of the battery system.

As described above, after the consistency between the controller 50 and the voltage monitoring unit 20 is determined as normal by the consistency determination processing (that is, by the first consistency determination processing), the consistency determination processing is performed again (that is, the second consistency determination processing is performed). If the consistency is determined as not normal in this second consistency determination processing, the controller 50 can perform charging-discharging control in the saving travel mode, in which the controller 50 performs charging-discharging control by getting information about the voltage (voltage across terminals) of the assembled battery 10 using the inverter voltage VL, output from the voltage sensor 35, while permitting the charging and discharging of the assembled battery 10. In this manner, the controller 50 allows the vehicle to travel even when the state of the assembled battery 10 cannot be correctly obtained, thus preventing the situation in which the vehicle cannot travel.

If the wait status flag is ON in step S302, the processing proceeds to step S308 without performing the second consistency determination processing. In this case, the controller 50 can perform charging-discharging control of the assembled battery 10 in the saving travel mode. That is, when the consistency determination processing (i.e., first consistency determination processing) already determines that the consistency between the controller 50 and the voltage monitoring unit 20 is not normal and, after that, the user starts the battery system, the controller 50 can perform charging-discharging control of the assembled battery 10 in the saving travel mode without performing the consistency determination processing.

In the following two cases, a situation may occur in which the vehicle cannot travel. In one case, it is determined in the first consistency determination processing that the consistency between the controller 50 and the voltage monitoring unit 20 is normal and, after that, it is determined in the second consistency determination processing that the consistency is not normal. In the second case, regardless whether the consistency determination processing is already performed, the user performs consistency determination processing at battery system startup time after the voltage monitoring unit 20 is replaced and it is determined that the consistency is not normal. To avoid a situation in which the vehicle cannot travel, control can be performed in such a way that the saving travel mode is always executed to allow the vehicle to travel in the saving travel mode while permitting the charging and discharging of the assembled battery 10 or in such a way that a hybrid vehicle, which will be described later, travels only with the engine in the saving travel mode.

Figure 7:
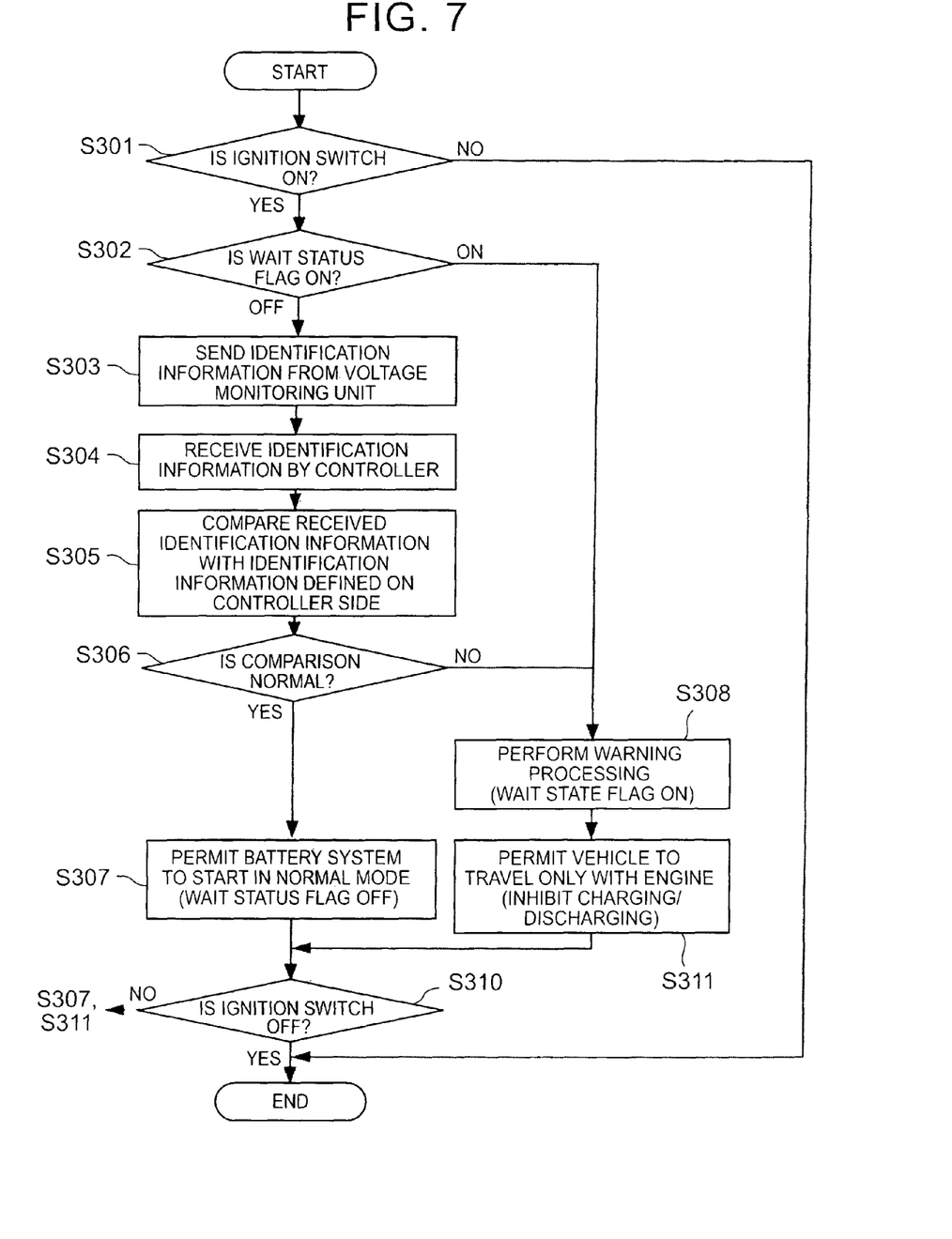
FIG. 7 is a flowchart showing a second example of consistency determination processing for the voltage monitoring unit and vehicle traveling according to the consistency determination result when the user starts running the vehicle after the voltage monitoring unit is replaced (mounted) in the exemplary embodiment.

FIG. 7 is a flowchart showing an example of the saving travel mode of a hybrid vehicle. The flowchart in FIG. 7 is similar to the flowchart in FIG. 6 except in step S311. In the example in FIG. 7, if it is determined in the first consistency determination processing that the consistency between the controller 50 and the voltage monitoring unit 20 is normal and, after that, it is determined in the second consistency determination processing that the consistency is not normal, the controller 50 does not permit the start of the battery system (charging and discharging of the assembled battery 10) as in the example in FIG. 5 but allows the vehicle to travel in the saving travel mode in which the vehicle travels only with the engine. In this case, too, the controller 50 allows the vehicle to travel even when the information about the state of the assembled battery 10 cannot be obtained correctly, thus preventing the situation in which the vehicle cannot travel.

In FIG. 6 and FIG. 7, if it is determined in the first consistency determination processing that the consistency between the controller 50 and the voltage monitoring unit 20 is normal and, after that, it is determined in the second consistency determination processing that the consistency is normal, that is, if it is determined in both the first consistency determination processing and the second consistency determination processing that the consistency is normal, the controller 50 performs the subsequent control as follows. That is, when the user starts the battery system later (when the user switches the ignition switch from off to on later), the controller 50 skips steps S303 to S306 to bypass the consistency determination processing and starts the battery system so that the vehicle can travel in the normal mode. This configuration reduces the load of the battery system startup processing and reduces the startup time.

Although an example mode is described above in which the voltage monitoring unit 20 or the battery pack already mounted on a vehicle is replaced, the present invention is not limited to this mode. For example, for the voltage monitoring unit 20 that is determined consistent with the controller 50 by the consistency determination processing performed during the vehicle manufacturing stage or is determined consistent with the controller 50 by another method, the consistency determination processing can be performed again when the user starts the battery system later. In this consistency determination processing, too, consistency between the controller 50 and the voltage monitoring unit 20 can be determined based on the control information that is predefined for the assembled battery 10, for which the controller 50 performs charging-discharging control, and is stored in the controller 50. After that, depending upon the detection result of the consistency determination processing, the controller 50 can perform control so that the mode of the vehicle moves to the saving travel mode.

The invention claimed is:

1. A power storage system mounted on a vehicle, the power storage system comprising:
   a power storage device configured to perform charging and discharging;
   a voltage monitoring unit configured to detect a voltage of the power storage device and output first identification information;
   a memory unit configured to store in advance second identification information, the second identification information being identification information about the voltage monitoring unit corresponding to control information predefined for the power storage device; and
   a controller configured to
   (a) control charging and discharging of the power storage device,
   (b) perform consistency determination processing, wherein the consistency determination processing includes comparing the first identification information and the second identification information to determine whether the first identification information and the second identification information are consistent, and
   (c) perform control such that the power storage device does not perform charging and discharging, when the controller determines that the first identification information and the second identification information are not consistent.

2. The power storage system according to claim 1, wherein the controller performs the consistency determination processing when the voltage monitoring unit is replaced.

3. The power storage system according to claim 2, wherein the controller does not perform consistency determination processing after the controller performs the consistency determination processing again and when the controller determines that the first identification information and the second identification information are consistent.

4. The power storage system according to claim 1, wherein a temperature sensor detects the temperature of the power storage device and outputs the detection result to the controller.

5. The power storage system according to claim 1, wherein
a current sensor is provided on the current path of the power storage device that detects the charging-discharging current flowing through the power storage device and outputs the detection result to the controller.

6. The power storage system according to claim 1, wherein
the voltage monitoring unit outputs the voltage detection values, corresponding one-to-one to the unit cells of the power storage device.

7. A power storage system mounted on a vehicle, the power storage system comprising:
a power storage device configured to perform charging and discharging;
a voltage monitoring unit configured to detect a voltage of the power storage device and output first identification information;
a memory unit configured to store in advance second identification information, the second identification information being identification information about the voltage monitoring unit corresponding to control information predefined for the power storage device;
a motor generator configured to receive power from the power storage device to generate kinetic energy used for a travel of the vehicle;
an inverter configured to convert a direct power of the power storage device to an alternating power and output the converted alternating current power;
a voltage sensor configured to detect a voltage of the inverter, and
a controller configured to
(a) control charging and discharging of the power storage device,
(b) perform consistency determination processing, wherein the consistency determination processing includes comparing the first identification information and the second identification information to determine whether the first identification information and the second identification information are consistent,
(c) perform the consistency determination processing again, when the controller determines that the first identification information and the second identification information are consistent and when the power storage device is started by a user, and
(d) control charging and discharging of the power storage device using the voltage of the inverter, the voltage of the inverter being detected by the voltage sensor, when the consistency determination processing is performed again and when the controller determines that the first identification information and the second identification information are not consistent.

8. A power storage system mounted on a vehicle, the vehicle including an engine, and a motor generator configured to receive power to generate kinetic energy used for a travel of the vehicle, the power storage system comprising:
a power storage device configured to perform charging and discharging;
a voltage monitoring unit configured to detect a voltage of the power storage device and output first identification information;
a memory unit configured to store in advance second identification information, the second identification information being identification information about the voltage monitoring unit corresponding to control information predefined for the power storage device; and
a controller configured to
control charging and discharging of the power storage device,
perform consistency determination processing, wherein the consistency determination processing includes comparing the first identification information and the second identification information to determine whether the first identification information and the second identification information are consistent,
perform the consistency determination processing again, when the controller determines that the first identification information and the second identification information are consistent and when the power storage device is started by a user,
perform control such that a travel of the vehicle with the engine is permitted while performing control such that charging and discharging of the power storage device is not performed, when the consistency determination processing is performed again and when the controller determines that the first identification information and the second identification information are not consistent.

9. A control device of a power storage device mounted on a vehicle, the vehicle including the power storage device, a voltage monitoring unit, and a memory unit, the power storage device being configured to perform charging and discharging,
the voltage monitoring unit being configured to detect a voltage of the power storage device and output first identification information, and the memory unit being configured to store in advance second identification information, the second identification information being identification information about the voltage monitoring unit corresponding to control information predefined for the power storage device, the control device comprising:
a controller configured to
(a) control charging and discharging of the power storage device,
(b) perform consistency determination processing, wherein the consistency determination processing includes comparing the first identification information and the second identification information to determine whether the first identification information and the second identification information are consistent, and
(c) perform control such that the power storage device does not perform charging and discharging, when the controller determines that the first identification information and the second identification information are not consistent.

10. A control method for a power storage device mounted on a vehicle, the vehicle including the power storage device, a voltage monitoring unit, a memory unit, and a controller, the power storage device being configured to perform charging and discharging, the voltage monitoring unit being configured to detect a voltage of the power storage device and output first identification information, and the memory unit being configured to store in advance second identification information, the second identification information being identification information about the voltage monitoring unit corresponding to control information predefined for the power storage device, the method comprising:
(a) controlling, by the controller, charging and discharging of the power storage device,
(b) performing, by the controller, consistency determination processing, wherein the consistency determination processing includes comparing the first identification information and the second identification information to determine whether the first identification information and the second identification information are consistent, and
(c) performing, by the controller, control such that the power storage device does not perform charging and discharging, when the controller determines that the first identification information and the second identification information are not consistent.

* * * * *